(12) United States Patent
Polmans et al.

(10) Patent No.: US 11,352,054 B2
(45) Date of Patent: Jun. 7, 2022

(54) METHOD FOR CONTROLLING A STEER-BY-WIRE STEERING SYSTEM WITH AN ACTIVE RETURN FUNCTION

(71) Applicants: thyssenkrupp Presta AG, Eschen (LI); thyssenkrupp AG, Essen (DE)

(72) Inventors: Kristof Polmans, Tarrenz (AT); Manuel Rohrmoser, Thüringen (AT)

(73) Assignees: thyssenkrupp Presta AG, Eschen (LI); thyssenkrupp AG, Essen (DE)

(*) Notice: Subject to any disclaimer, the term of this patent is extended or adjusted under 35 U.S.C. 154(b) by 87 days.

(21) Appl. No.: 16/765,058

(22) PCT Filed: Nov. 29, 2018

(86) PCT No.: PCT/EP2018/082961
§ 371 (c)(1),
(2) Date: May 18, 2020

(87) PCT Pub. No.: WO2019/106070
PCT Pub. Date: Jun. 6, 2019

(65) Prior Publication Data
US 2020/0361530 A1    Nov. 19, 2020

(30) Foreign Application Priority Data
Dec. 1, 2017  (DE) .................... 10 2017 128 554.7

(51) Int. Cl.
*B62D 6/00*     (2006.01)
*B62D 5/00*     (2006.01)
*B62D 6/10*     (2006.01)

(52) U.S. Cl.
CPC ............. *B62D 6/008* (2013.01); *B62D 5/006* (2013.01); *B62D 6/10* (2013.01)

(58) Field of Classification Search
CPC ............................. B62D 6/008; B62D 5/0466
See application file for complete search history.

(56) References Cited

U.S. PATENT DOCUMENTS 5,908,457 A    6/1999  Higashira et al.
6,082,482 A    7/2000  Kato
(Continued)

FOREIGN PATENT DOCUMENTS

CN    101421146 A    4/2009
CN    102774416 A    11/2012
(Continued)

OTHER PUBLICATIONS

English Translation of International Search Report issued in PCT/EP2018/082961, dated Mar. 27, 2019.

*Primary Examiner* — Ryan Rink
(74) *Attorney, Agent, or Firm* — thyssenkrupp North America, LLC

(57) ABSTRACT

A method of controlling a steer-by-wire steering system for motor vehicles is disclosed for the calculation of a resulting self-aligning torque of a feedback actuator in a manner which is dependent on an operating state (hands-on/hands-off). The method includes determining of a base self-aligning torque for a first operating state, in which there is hand contact by a driver on a steering wheel, determining a hands-off self-aligning torque for a second operating state, in which there is no hand contact by the driver on the steering wheel, determining a self-aligning speed of the steering wheel for the first operating state and for the second operating state, and determining the resulting self-aligning torque on the basis of the base self-aligning torque or the hands-off self-aligning torque, as a result of which the steering wheel rotates at the defined self-aligning speed into the defined position.

12 Claims, 3 Drawing Sheets

(56) References Cited

U.S. PATENT DOCUMENTS

| | | |
|---|---|---|
| 8,249,777 B2 | 8/2012 | Greul |
| 8,849,517 B2 | 9/2014 | Kluge |
| 2008/0249685 A1 | 10/2008 | Hara et al. |
| 2013/0190988 A1* | 7/2013 | Limpibunterng .... B62D 15/025 701/42 |
| 2015/0232124 A1* | 8/2015 | Takeda .................... B62D 6/04 701/42 |
| 2015/0274201 A1* | 10/2015 | Kunihiro ................ B62D 1/286 701/41 |
| 2016/0107679 A1* | 4/2016 | Kimura ............... B62D 5/0463 701/42 |
| 2017/0029021 A1* | 2/2017 | Lee ....................... G05D 1/0088 |
| 2017/0144697 A1 | 5/2017 | Lim et al. |
| 2018/0001927 A1* | 1/2018 | Howing .................... B62D 6/10 |
| 2019/0161116 A1* | 5/2019 | Moreillon ............... B62D 1/286 |
| 2019/0217886 A1* | 7/2019 | Rohrmoser ........... B60W 50/00 |
| 2021/0253161 A1* | 8/2021 | Yoshida ................. B62D 6/002 |

FOREIGN PATENT DOCUMENTS

| | | | |
|---|---|---|---|
| CN | 103171614 A | 6/2013 | |
| CN | 106515708 A | 3/2017 | |
| CN | 106741133 A | 5/2017 | |
| DE | 198 06 458 A | 8/1998 | |
| DE | 10 2007 039 332 A | 2/2008 | |
| DE | 10 2011 002 997 A | 7/2012 | |
| DE | 10 2016 005 013 A | 10/2017 | |
| EP | 2 393 701 B | 11/2013 | |

* cited by examiner

METHOD FOR CONTROLLING A STEER-BY-WIRE STEERING SYSTEM WITH AN ACTIVE RETURN FUNCTION

CROSS REFERENCE TO RELATED APPLICATIONS

This application is a U.S. National Stage Entry of International Patent Application Serial Number PCT/EP2018/082961, filed Nov. 29, 2018, which claims priority to German Patent Application No. DE 10 2017 128 554.7, filed Dec. 1, 2017, the entire contents of both of which are incorporated herein by reference.

FIELD

The present disclosure generally relates to a method for controlling a steer-by-wire steering system.

BACKGROUND

In the case of steer-by-wire steering systems, the position of the steered wheels is not coupled directly to the steering input means, for example a steering wheel. There is a connection between the steering wheel and the steered wheels via electric signals. The driver's steering request is tapped off by a steering angle sensor, and the position of the steered wheels is regulated via a steering actuator in a manner which is dependent on the driver's steering request. A mechanical connection to the wheels is not provided, with the result that no direct force feedback effect is transmitted to the driver after actuation of the steering wheel. A correspondingly adapted feedback effect is provided, however, for example in the case of parking or when driving straight ahead, in the case of which a steering torque which is different depending on the vehicle manufacturer and is adapted to the vehicle reaction is desired as a force feedback effect. In the case of driving around a bend, reaction forces act as transverse forces on the steering gear, which reaction forces are recreated by the feedback actuator in the form of a torque which is opposed to the steering direction. The driver experiences a steering feel which can be predefined by way of this. In order to simulate the feedback effects of the road on the steering wheel in the case of steer-by-wire steering systems, it is necessary for a feedback actuator (FPA) to be provided on the steering wheel or the steering column, which feedback actuator imparts a steering feel in a manner which is dependent on the desired feedback effects of the steering handle.

A steering wheel monitoring means can be provided which determines whether there is driver activity on the steering wheel or not. Here, in the following text, a state in which the driver has gripped the steering wheel is called a hands-on state, and a state in which the driver has not gripped the steering wheel, that is to say driving without hands, is called a hands-off state, which corresponds to the terms which are used in these technical fields.

The prior art, for example laid open specifications DE 10 2007 039 332 A1 and DE 10 2011 002 997 A1, has disclosed methods for the detection of a hands-on/hands-off state. A self-alignment of the steering wheel into a neutral position which corresponds to a straight ahead position of the vehicle wheels is not taken into consideration here. It can therefore occur that the steering wheel turns back into a zero position too rapidly in a hands-off state. This is disturbing for the driver and can lead to an overshooting steering wheel. Here, the zero position, the straight ahead position and the neutral position of the steering wheel denote the same position and are used as synonyms.

In electromechanical steering systems, there is what is known as an active return function. This uses a torque sensor (TSU) to measure the manual torque at the steering wheel. The self-alignment is changed in a manner which is dependent on the measured torque. A steering wheel which self-aligns rapidly and possibly leads to an overshooting steering wheel is damped by way of the mechanism in electromechanical steering systems. In steer-by-wire steering systems, in contrast, the active return function has to function considerably more rapidly and robustly, in order, for example, to damp a steering wheel which is self-aligning too rapidly.

Thus, a need exists for an improved method for self-aligning the steering wheel into a neutral position for a steer-by-wire steering system of a motor vehicle.

DETAILED DESCRIPTION

Figure 1:
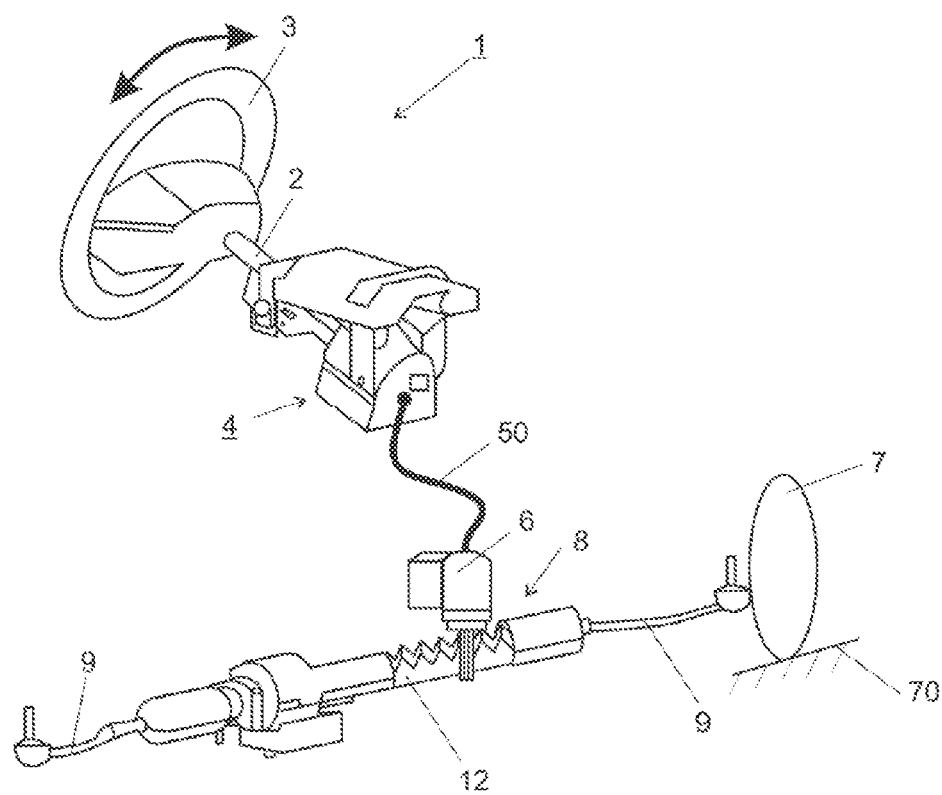
FIG. 1 is a diagram of a steer-by-wire steering system.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a method for controlling a steer-by-wire steering system having the features of the preamble of the independent claim and to a steer-by-wire steering system having the features of the preamble the independent claim.

Accordingly, a method for controlling a steer-by-wire steering system for motor vehicles is provided, comprising a steering actuator which acts on the steered wheels and is regulated electronically in a manner which is dependent on a driver's steering request, a feedback actuator which transmits feedback effects of the road to a steering wheel in the form of a self-aligning torque, and a feedback actuator monitoring unit which controls the feedback actuator, wherein a detection unit detects the operating state of whether there is hand contact by the driver on the steering wheel or not. The following method steps are provided for the calculation of a resulting self-aligning torque of the steering wheel into a defined position in a manner which is dependent on the operating state:
- determining of a base self-aligning torque for a first operating state, in which there is hand contact by the driver on the steering wheel;
- determining of a hands-off self-aligning torque for a second operating state, in which there is no hand contact by the driver on the steering wheel;
- determining of a self-aligning speed of the steering wheel for the first operating state and for the second operating state;
- determining of the resulting self-aligning torque on the basis of the base self-aligning torque or the hands-off self-aligning torque, as a result of which the steering wheel rotates at the defined self-aligning speed into the defined position in order to rotate the steering wheel.

As a result, it is to be ensured that, both in the case when the steering wheel is actuated or gripped by the driver and when there is no hand contact on the steering wheel, the steering wheel does not carry out uncontrolled movements, but rather rotates into the defined position at a self-aligning speed which is pleasant for the driver. The defined position of the steering wheel is particularly preferably the neutral position of the steering wheel, which neutral position corresponds to the straight ahead position of the vehicle wheels.

The base self-aligning torque and/or the hands-off self-aligning torque are/is preferably determined on the basis of a model.

In one preferred embodiment, the hands-off self-aligning torque is determined by means of a steering wheel speed regulator.

Furthermore, for the determination of the resulting self-aligning torque, a weighting unit is provided which gives more weight to the base self-aligning torque in the case of the first operating state and gives more weight to the hands-off self-aligning torque in the case of the second operating state.

In one embodiment, the following method steps are provided:
- determining of a base self-aligning torque for the case where there is hand contact on the steering wheel, wherein a steering friction and a first steering damping action are provided for the first operating state in addition to the base self-aligning torque;
- determining of a second steering damping action for the second operating state;
- determining of a weighted steering damping action from the first steering damping action and the second steering damping action by way of a weighting operation in a weighting unit, the weighting being determined by way of the operating state which is detected by the detection unit;
- calculating of the resulting self-aligning torque by means of the base self-aligning torque and the weighted steering damping action.

The steering feel can thus be adapted to the operating state, in order to ensure improved self-aligning.

It is advantageous here if the steering friction in the form of a steering hysteresis feeds into the calculation of the resulting self-aligning torque.

In one embodiment, the second steering damping action is determined by means of an estimator which receives signals from the feedback actuator, which signals correspond to the steering angle and a torque, preferably a torque which is introduced to the steering wheel by way of the driver. It is advantageous here if a minimum value for the second steering damping action is defined, with the result that the steering wheel does not overshoot in an uncontrolled manner and turns back as far as a straight ahead position.

In a second embodiment, the self-aligning speed takes place by means of at least one predefined characteristic curve. The at least one characteristic curve is preferably three-dimensional and has a dependence on the steering angle and on a vehicle speed. Here, the at least one characteristic curve is preferably half a parabola.

It is advantageous if the detection unit for the detection of the operating state carries out the following steps:
a) determining of a frequency spectrum of movement signals which are detected by sensors of the feedback actuator,
b) analyzing of the frequency spectrum by way of determining of the damping action of amplitudes of predefined frequency ranges,
c) estimating of a driver's steering torque by means of a suitable observer of the feedback actuator, a model of the feedback actuator and the movement signals.

The feedback actuator monitoring unit preferably requires only the steering angle α and/or a steering torque $T_{driver}$ which is applied to the steering wheel for the calculation of the self-aligning torque. A torque sensor is therefore not required.

Furthermore, a steer-by-wire steering system for motor vehicles is provided, comprising a steering actuator which acts on the steered wheels and is regulated electronically in a manner which is dependent on a driver's steering request, a feedback actuator which transmits feedback effects of the road to a steering wheel in the form of a self-aligning torque, and a feedback actuator monitoring unit which controls the feedback actuator, wherein a detection unit detects the operating state of whether there is hand contact by the driver on the steering wheel or not, and the feedback actuator monitoring unit being set up to carry out the above-described method.

FIG. 1 shows a steer-by-wire steering system 1. A rotary angle sensor (not shown) is attached to a steering shaft 2, which rotary angle sensor detects the driver's steering angle which is applied by way of rotation of the steering input means 3 which is configured as a steering wheel in the example. A steering torque can also additionally be detected, however. Furthermore, a feedback actuator 4 is attached to the steering shaft 2, which feedback actuator 4 serves to simulate the feedback effects of the roadway 70 on the steering wheel 3 and therefore to give feedback to the driver about the steering and driving behavior of the vehicle. An electric steering actuator 6 controls the position of the steered wheels 7. The steering actuator 6 acts via a steering rod steering gear 8, such as a rack steering gear, the rack 12 acting on the steered wheels 7 indirectly via ball joints (not shown) with track rods 9 and other components.

Figure 2:
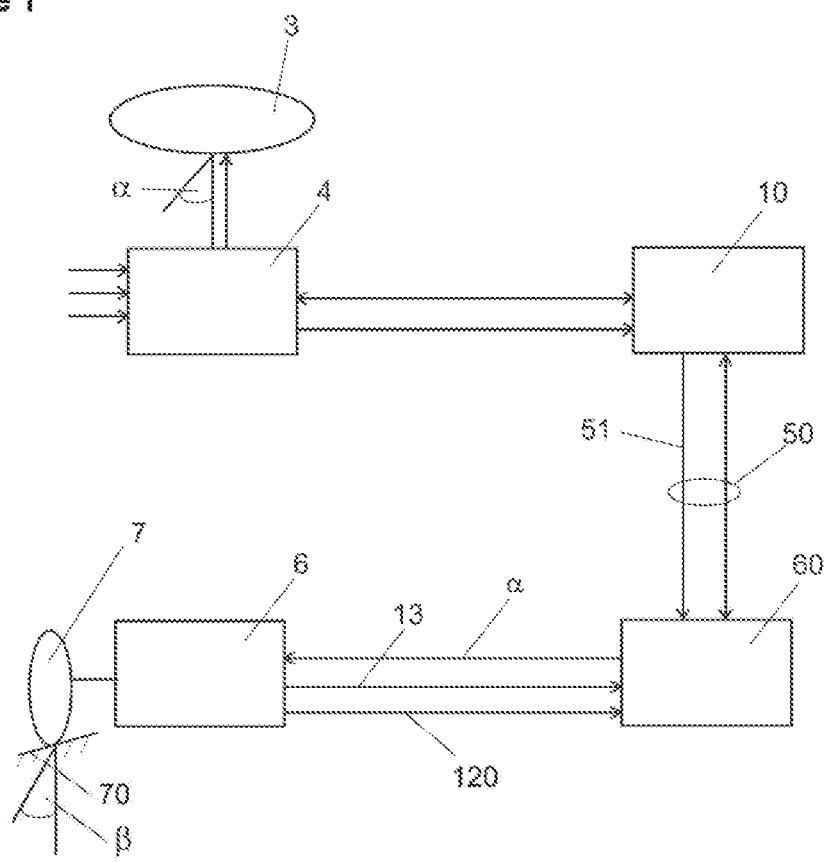
FIG. 2 is a block diagram of a control operation of the steer-by-wire steering system.

FIG. 2 shows a control operation of the feedback actuator 4. The driver's steering request is transmitted via that rotary angle α of the steering shaft 2 which is measured by the rotary angle sensor to a feedback actuator monitoring unit 10 via signal lines. The feedback actuator monitoring unit 10 transmits the driver's steering request to an actuation unit 60. The feedback actuator monitoring unit 10 preferably also takes over the actuation of the feedback actuator 4. The feedback actuator monitoring unit 10 can also be configured integrally with the actuation unit 60. The actuation unit 60 actuates the electric steering actuator 6 in a manner which is dependent on the signal of the rotary angle sensor and further input variables.

Figure 3:
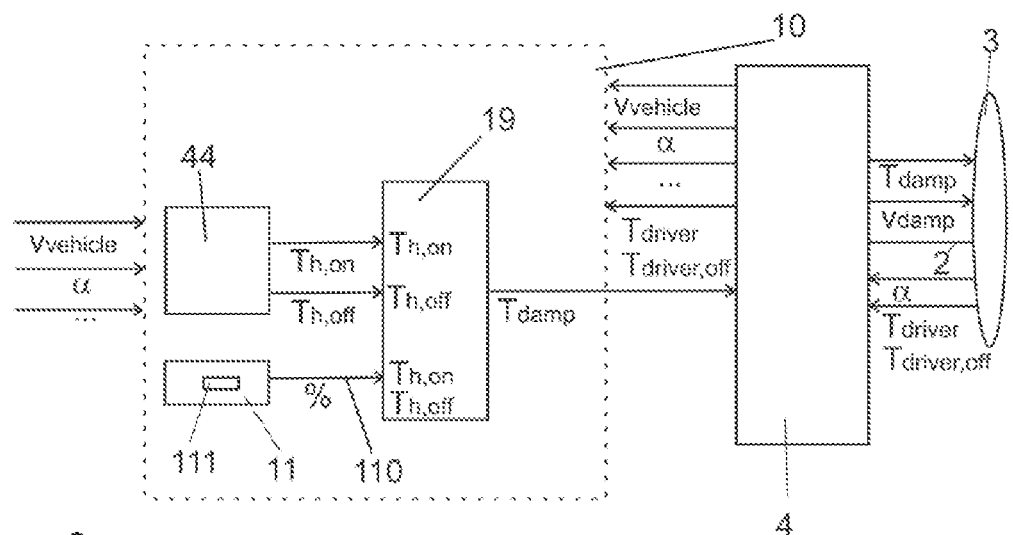
FIG. 3 is a block diagram of the actuation operation of the feedback actuator.

The feedback actuator 4 receives signals via the signal line 50, inter alia, from the rotary angle sensor which measures and stores the rotary angle α, the steering angle acceleration and the steering angle speed. The feedback actuator 4 communicates with the feedback actuator monitoring unit 10 which controls the feedback actuator 4. From the actuation unit 60 of the steering actuator 6, the feedback actuator monitoring unit 10 receives the actual wheel steering angle β of the steered wheels 7, and further variables which the actuation unit 60 has determined. The rack position 120 which is measured on a rack 12 and further roadway information 13 are forwarded to the actuation unit 60. Furthermore, the actuation unit 60 receives driver-side steering commands 51, such as the steering angle status. FIG. 3 shows one preferred embodiment of the actuation operation of the feedback actuator 4 in detail. The feedback actuator monitoring unit 10 receives the rotary angle α of the steering shaft 2, which rotary angle α is measured by the rotary angle sensor, the torque $T_{driver}$ which is applied by the driver, and the vehicle speed $v_{vehicle}$. A detection unit 11 detects whether there is an operating state at the steering wheel 3. The one operating state is defined by virtue of the fact that there is a hand contact (hands-on) or a manual force $T_{driver}$ from the driver on the steering wheel, and the other operating state is defined by virtue of the fact that there is no hand contact on the steering wheel (hands off) $T_{driver.off}$. The detected operating state 110 serves as an input for a weighting unit 19. A model-based driver's steering torque estimator 111 is used which performs the determination of the operating state (hands-on/off) on the basis of an estimated driver's steering torque.

To this end, the following steps are provided:
a) determining of a frequency spectrum of movement signals which are detected by sensors of the feedback actuator,
b) analyzing of the frequency spectrum with determination of the damping of amplitudes of predefined frequency ranges,
c) estimating of a driver's steering torque by means of a suitable observer of the feedback actuator, a model of the feedback actuator and the movement signals.

The steering torque estimator 111 receives signals from the feedback actuator 4, which signals represent a steering angle α which prevails at the feedback actuator and a torque. The steering angle which is measured by the feedback actuator by means of the rotary angle sensor and the torque which is measured by means of the torque sensor therefore represent the input variables for the estimator 111. From said measured values, the estimator 111 estimates a steering torque of the driver or a driver's steering torque which the driver applies to the steering wheel. To this end, the estimator uses a model of the feedback actuator and a Kalman filter, as observer. As an input for the state model of the feedback actuator, the following physical properties, inter alia, are taken into consideration: the inertia, damping/friction, rigidity, non-uniformity and dead time of the system. In addition to the estimated driver's steering torque, the damping of amplitudes of predefined frequency ranges is determined from the steering angle and torque measured by the feedback actuator by means of a filter. When the driver grips the steering wheel, vibrations are partly absorbed on account of the novel mechanical overall system and the changed damping properties. The frequency spectra of the non-gripped steering wheel differ characteristically from those of the gripped steering wheel. The difference between the hands-on state and the hands-off state can therefore be seen in the frequency spectrum of the measured sensor signals of the feedback actuator.

If the vibrations which occur during driving operation are not sufficient for the determination of the damping actions of the amplitudes in the predefined frequency ranges, a test signal at a defined intensity and amplitude is additionally introduced into the feedback actuator by means of the feedback motor, and a symmetrical oscillation is generated at the steering wheel. Thereupon, influencing of the feedback actuator by way of contact of the steering wheel is detected and therefore the actual operating state (hands-on/off) is determined in turn on the basis of the estimated driver's steering torque and by means of frequency analysis of a filter.

The feedback actuator monitoring unit 10 calculates a self-aligning torque $T_{damp}$ which the feedback actuator 4 transmits to the steering shaft 2 for the provision of a steering feel.

The steering angle α which is applied by the driver at a defined steering angle speed and/or a steering torque $T_{driver}$ which is applied to the steering wheel 3 are/is measured. In addition, further parameters, such as the vehicle speed $v_{vehicle}$ or the friction, are determined. It is also conceivable to use parameters of the steering actuator, such as lateral forces which act on the vehicle, wheel position, rack position, etc. On the basis of said parameters, the state of the vehicle is determined (straight ahead driving, driving around bends, parking/unparking operation). Subsequently, it is determined by means of the detection unit 11 whether there is a hands-on/off state at the steering wheel.

In order to determine the resulting self-aligning torque $T_{damp}$, the detected operating state 110 is transmitted as a percentage proportion to the weighting unit 19. Here, there is a hands-off state between 0% and 50%, whereas there is a hands-on state at the steering wheel between 51% and 100%.

A steering feel model 44 receives signals from the feedback actuator, which signals correspond to the steering angle α and a torque, and determines a base self-aligning torque $T_{H,on}$ for the first operating state and a hands-off self-aligning torque $T_{H,off}$ for the second operating state. In this way, the steering feel model 44 adapts the resulting self-aligning torque $T_{damp}$ and therefore the steering feel, with the result that "ideal" self-aligning is achieved. Here, a critical damping action (minimum damping action) is defined, with the result that the steering wheel does not overshoot in an uncontrolled manner, but rather turns back as far as the centering torque or as far as the straight ahead position. In the case of the critical damping action, the steering wheel rotates back at the maximum possible speed, without overshooting. Other steering feel parameters can likewise be adapted.

Figure 4:
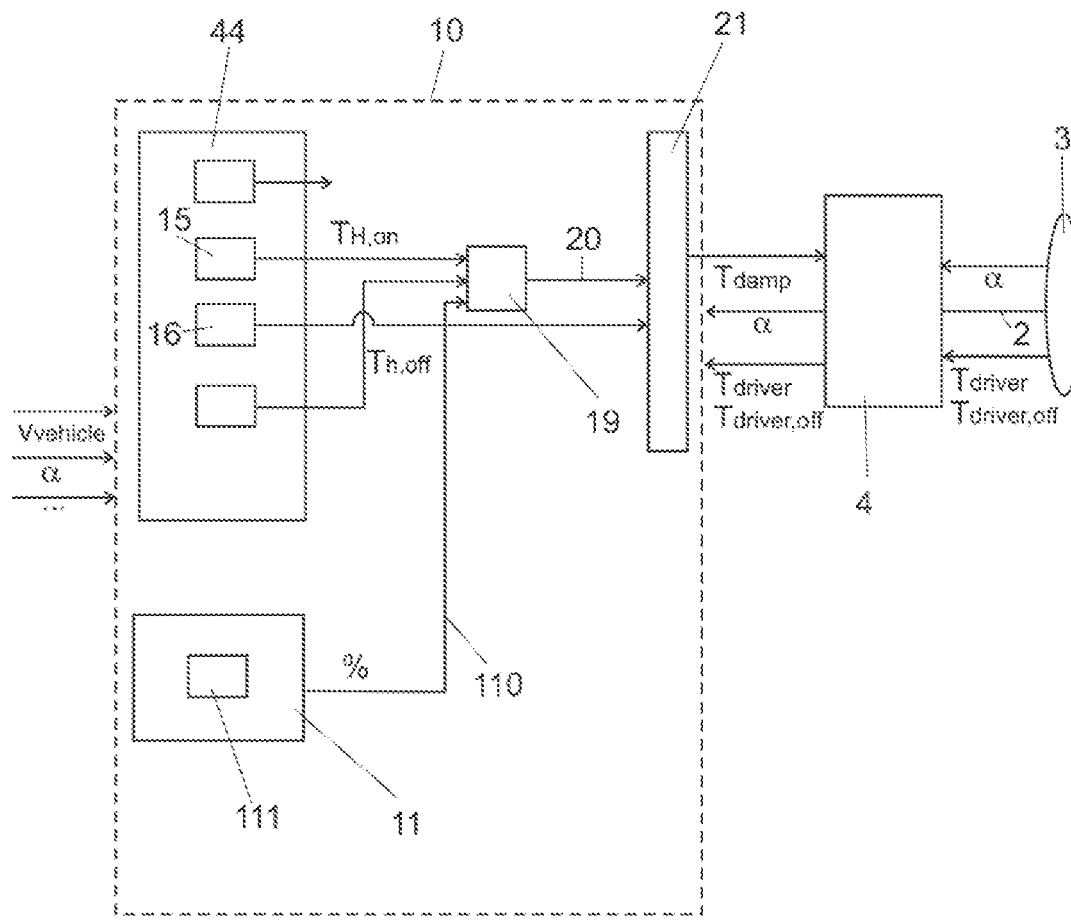
FIG. 4 is a more detailed block diagram of the actuation operation of the feedback actuator from FIG. 3.

The steering feel model 44 transmits the self-aligning torques to the weighting unit 19 which gives greater weight to the base self-aligning torque or the hands-off self-aligning torque in a manner which is dependent on the detected operating state 110. The self-aligning torque which is given greater weight is introduced as resulting self-aligning torque $T_{damp}$ into a motor (not shown) of the feedback actuator 4, which motor moves the steering wheel back into a straight ahead position at a defined self-aligning speed $v_{damp}$ via self-aligning forces, it being possible for the driver to discern the centering torque at the steering wheel. An ideal self-aligning speed $v_{damp}$ of the steering wheel in a manner which is dependent on various driving properties (driving speed, steering angle, etc.) is defined in advance with the aid of at least one three-dimensional characteristic curve, the at least one characteristic curve having a dependence on the steering angle and on the vehicle speed. The determined self-aligning speed $v_{damp}$ is first of all transmitted to the feedback actuator 4 and subsequently to the steering wheel. FIG. 4 shows a detailed configuration of the embodiment of FIG. 3 of the actuation operation of the feedback actuator 4. For the calculation of a self-aligning torque of the steering wheel in the hands-on state, the base self-aligning operation $T_{H,on}$, which represents the base self-aligning torque of the feedback actuator 4, is determined in the model 44. The base self-aligning operation $T_{H,on}$ is the self-aligning torque which is calculated in accordance with conventional methods and is to be applied by the feedback actuator 4. In order to impart the feeling of a conventional steering system to the driver in the case of a steer-by-wire steering system in the hands-on state, the steering model 44 additionally has a steering damping operation 15 which damps intense or sudden steering reactions and steering movements. In addition, a steering hysteresis 16 (steering torque-steering angle) is provided in the model 44, which steering hysteresis 16 determines the steering friction.

In the case of a hands-off state, a self-aligning torque $T_{H,off}$ which is "ideal" for said state is generated. An estimator receives signals from the feedback actuator, which signals correspond to the steering angle α and a torque, and adapts the self-aligning torque and therefore the steering feel, with the result that an "ideal" self-aligning action is achieved. Here, a critical damping action (minimum damping action) is defined, with the result that the steering wheel does not overshoot in an uncontrolled manner, but rather turns back as far as the centering torque or as far as the straight ahead position. In the case of the critical damping action, the steering wheel turns back at the maximum possible speed, without overshooting. Other steering feel parameters can likewise be adapted.

Furthermore, a weighting unit 19 is provided which performs a weighting operation between the damping action in the hands-on state and the damping action in the hands-off state by means of a weighted mean value function. Here, the weighting operation is determined by way of the hands-on/off operating state 110.

The weighted damping action 20 is applied to the base self-aligning torque $T_{H,on}$ and the hands-off torque $T_{H,off}$ in a summer 21. In addition, the steering hysteresis 16 feeds into the summer 21. The output value of the summer 21 is the resulting self-aligning torque $T_{damp}$ which is used for the actuation of the feedback actuator.

Figure 5:
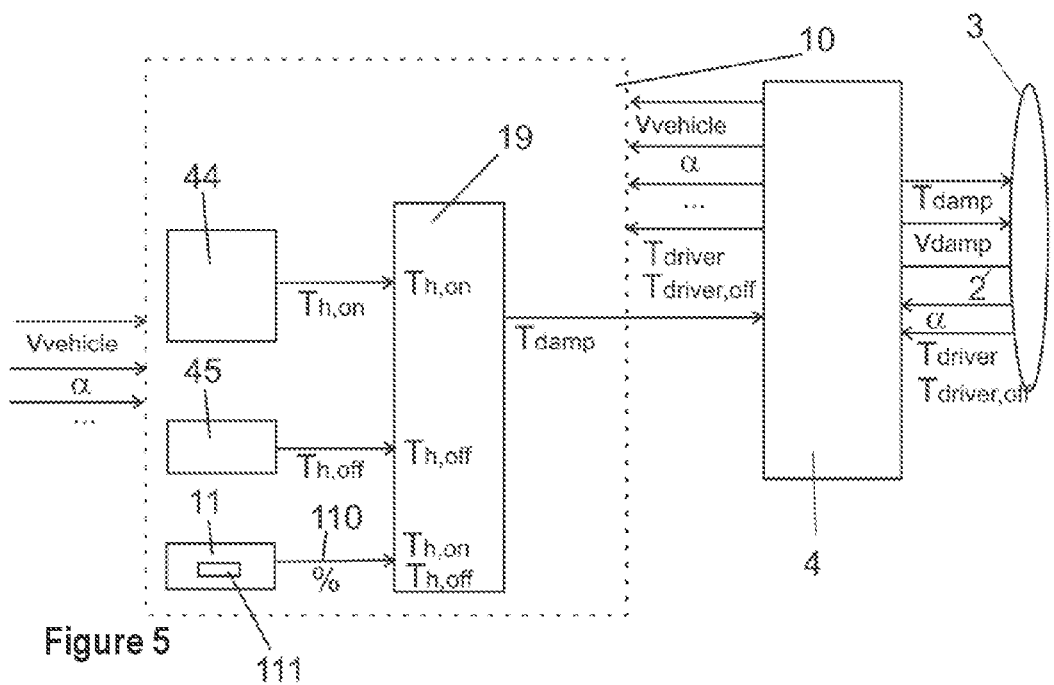
FIG. 5 is a block diagram of a further embodiment of the actuation operation of the feedback actuator.
Figure 6:
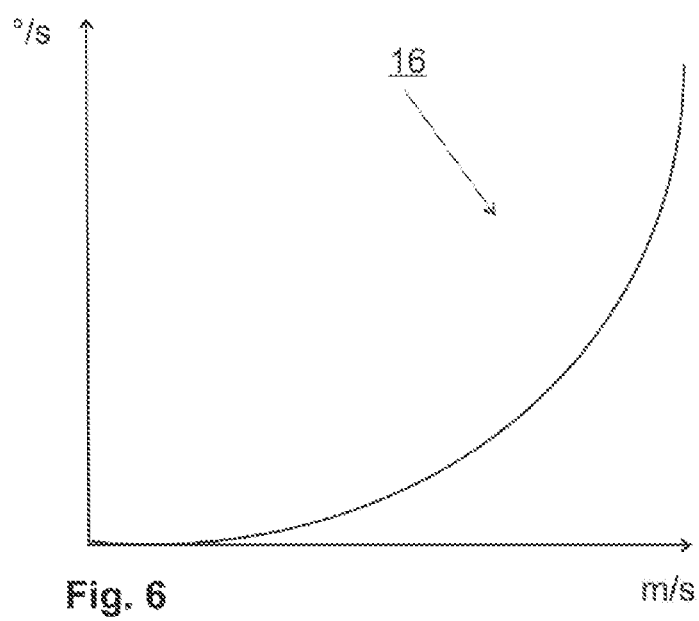
FIG. 6 is a diagram of the profile of the steering wheel speed plotted against the vehicle speed.

FIG. 5 shows a further preferred embodiment of the actuation operation of the feedback actuator 4. The base self-aligning torque $T_{H,on}$ is determined by means of the steering feel model 44, and the hands-off self-aligning torque $T_{H,off}$ is determined via a steering wheel speed regulator 45. The percentage proportion of the operating state, as described above, is determined via the determination unit 11. If there is no hand contact on the steering wheel 3, the weighting unit 19 gives greater weight to the steering wheel speed regulator 45. The steering wheel speed regulator 45 compares the currently measured steering wheel speed with the characteristic curve and correspondingly gives it greater weight, with the result that the desired hands-off self-aligning torque $T_{H,off}$ is realized. The characteristic curve can be, for example, half a parabola, as shown in FIG. 6. The hands-off self-aligning torque which is given greater weight is introduced as resulting self-aligning torque $T_{damp}$ into a motor (not shown) of the feedback actuator 4, which motor moves the steering wheel back into a straight ahead position at a defined self-aligning speed $v_{damp}$ via self-aligning forces. If there is hand contact on the steering wheel, the base self-aligning torque which is generated via the steering feel model is given a higher weight and is forwarded as resulting self-aligning torque to the feedback actuator.

What is claimed is:

1. A method of controlling a steer-by-wire steering system for motor vehicles comprising a steering actuator which acts on steered wheels and is regulated electronically dependent on a driver steering request, a feedback actuator which transmits feedback effects of a road to a steering wheel in the form of a self-aligning torque, and a feedback actuator monitoring unit which controls the feedback actuator, wherein a detection unit detects the operating state of whether there is hand contact on the steering wheel or not, comprising calculating a resulting self-aligning torque of the steering wheel into a defined position in a manner which is dependent on the operating state comprising the steps of:
   determining a base self-aligning torque for a first operating state, in which there is hand contact on the steering wheel;
   determining a hands-off self-aligning torque for a second operating state, in which there is no hand contact on the steering wheel;
   determining a self-aligning speed of the steering wheel for the first operating state and for the second operating state; and
   determining the resulting self-aligning torque on the basis of the base self-aligning torque or the hands-off self-aligning torque, as a result of which the steering wheel rotates at the defined self-aligning speed into the defined position, wherein for the determination of the resulting self-aligning torque, a weighting unit is provided which gives more weight to the base self-aligning torque in the case of the first operating state and gives more weight to the hands-off self-aligning torque in the case of the second operating state.

2. The method of claim 1 comprising determining the base self-aligning torque and/or the hands-off self-aligning torque on the basis of a model.

3. The method of claim 1 comprising determining the hands-off-self-aligning torque via a steering wheel speed regulator.

4. A method of controlling a steer-by-wire steering system for motor vehicles comprising a steering actuator which acts on steered wheels and is regulated electronically dependent on a driver steering request, a feedback actuator which transmits feedback effects of a road to a steering wheel in the form of a self-aligning torque, and a feedback actuator monitoring unit which controls the feedback actuator, wherein a detection unit detects the operating state of whether there is hand contact on the steering wheel or not, comprising calculating a resulting self-aligning torque of the steering wheel into a defined position in a manner which is dependent on the operating state comprising the steps of:
   determining a base self-aligning torque for a first operating state, in which there is hand contact on the steering wheel;
   determining a hands-off self-aligning torque for a second operating state, in which there is no hand contact on the steering wheel;
   determining a self-aligning speed of the steering wheel for the first operating state and for the second operating state; and
   determining the resulting self-aligning torque on the basis of the base self-aligning torque or the hands-off self-aligning torque, as a result of which the steering wheel rotates at the defined self-aligning speed into the defined position;

determining a base self-aligning torque for the case where there is hand contact on the steering wheel, wherein a steering friction and a first steering damping action are provided for the first operating state in addition to the base self-aligning torque;

determining a second steering damping action for the second operating state;

determining a weighted steering damping action from the first steering damping action and the second steering damping action via a weighting operation in a weighting unit, the weighting being determined by way of the operating state which is detected by the detection unit; and calculating the resulting self-aligning torque via the base self-aligning torque and the weighted steering damping action.

5. The method of claim 4 wherein the steering friction in the form of a steering hysteresis feeds into the calculation of the resulting self-aligning torque.

6. The method of claim 4 wherein the second steering damping action is determined via an estimator which receives signals from the feedback actuator, which signals correspond to the steering angle and a torque.

7. The method of claim 6 wherein a minimum value for the second steering damping action is defined, with the result that the steering wheel turns back as far as a straight ahead position.

8. The method of claim 1 wherein the self-aligning speed takes place via at least one predefined characteristic curve.

9. The method of claim 8 wherein the at least one characteristic curve is three-dimensional and has a dependence on the steering wheel steering angle and on a vehicle speed.

10. The method of claim 1 wherein the detection unit for the detection of the operating state carries out the following steps:

determining a frequency spectrum of movement signals which are detected by sensors of the feedback actuator, analyzing the frequency spectrum via determining of the damping action of amplitudes of predefined frequency ranges, and estimating a driver's steering torque by means of a suitable observer of the feedback actuator, a model of the feedback actuator, and the movement signals.

11. The method of claim 1 wherein the feedback actuator monitoring unit requires the steering angle and/or a steering torque which is applied to the steering wheel for the calculation of the self-aligning torque.

12. A steer-by-wire steering system for motor vehicles, comprising:

a steering actuator which acts on steered wheels of the motor vehicle, and is regulated electronically in a manner which is dependent on a steering request, a feedback actuator which transmits feedback effects of a road to a steering wheel in the form of a self-aligning torque, and a feedback actuator monitoring unit which controls the feedback actuator, wherein a detection unit detects the operating state of whether there is hand contact on the steering wheel or not, wherein the feedback actuator monitoring unit is configured to carry out the method of claim 1.

* * * * *